Nov. 25, 1969  D. F. DURHAM ET AL  3,480,338
SEALS FOR TRACK LINK ASSEMBLIES
Filed Nov. 13, 1967  2 Sheets-Sheet 1

INVENTORS
DONALD F. DURHAM
DUANE L. BURK

BY
Fryer, Tjensvold, Feix, Phillips & Lempio
ATTORNEYS

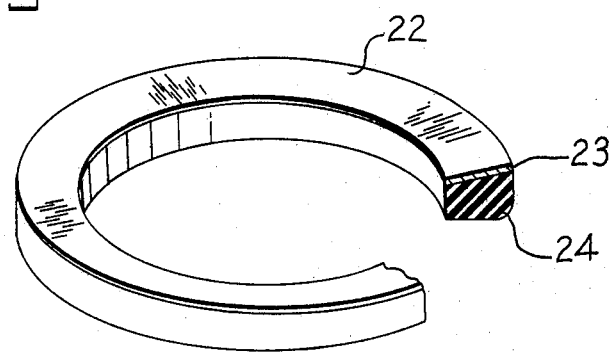
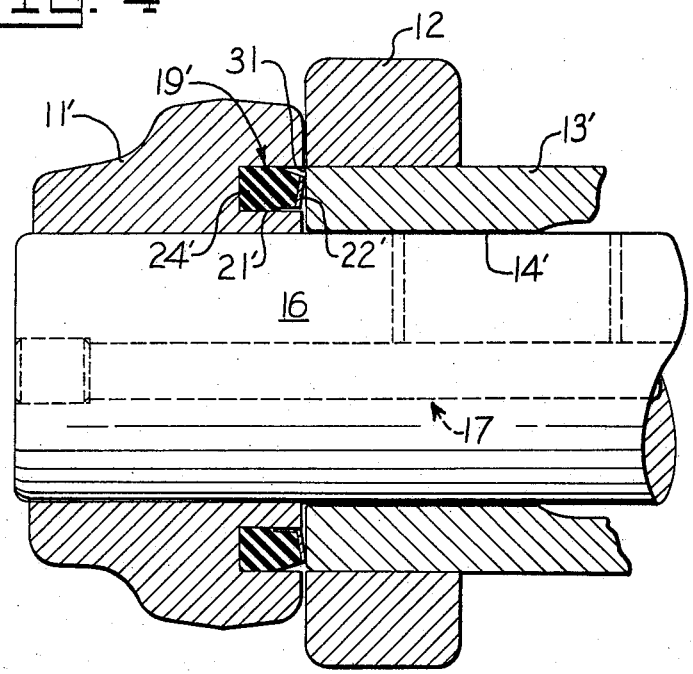

United States Patent Office  3,480,338
Patented Nov. 25, 1969

3,480,338
SEALS FOR TRACK LINK ASSEMBLIES
Donald F. Durham and Duane L. Burk, Peoria, Ill., assignors to Caterpillar Tractor Co., Peoria, Ill., a corporation of California
Filed Nov. 13, 1967, Ser. No. 682,412
Int. Cl. B62d 55/26; F16j 15/38, 15/54
U.S. Cl. 305—11                                    4 Claims

ABSTRACT OF THE DISCLOSURE

A seal assembly disposed in an annular recess formed by a track link and bushing of a track link assembly comprises a pair of thin frustoconical spring washer seals with their outer edges urged into angular sealing engagement by resilient members respectively bonded thereto. To provide for continuous, long-life sealing operation, that portion of the annular recess which contains the seal assembly is generally symmetrical.

---

The present invention is particularly concerned with provision of an effective seal for the track hinge joints of track link assemblies for track type vehicles. The desirability of effective sealing in this location is evident from the numerous seals described in the prior art. However, consideration of the environment in which these vehicles are employed points up the difficulty of designing a simple, effective seal assembly, having a long operating life. By the nature of the vehicles, the track link assemblies are subjected to great stresses between the relatively rotatable members forming the hinge joints of the track link assemblies. Lubricant must necessarily be maintained within the hinged joints to resist abrasion of the relatively rotating member. In fact, it is commonly desirable to provide for "permanent lubrication" within the track link assemblies. In addition, the vehicles are normally operated in environments where the tracks are surrounded with abrasives such as dirt, sand, mud and dust. These abrasives must be prevented from entering the hinge joints not only because of their abrasive nature but also due to their tendency to dry up lubricant therein and thus further increase wear.

Thus, it is a principal object of this invention to provide a simple, effective and long life seal assembly for the hinge joint of track link assemblies.

A further object is the provision of a resiliently supported seal to maintain effective sealing in a track link assembly even during misalignments of its relatively rotating parts.

Another object is the provision of sealing means in a track link assembly, which, as its sealing surfaces wear away, tends to generate new sealing surfaces of similar characteristics.

Other objects and advantages of the present invention will be made apparent by the following description and the accompanying drawings wherein:

FIG. 3 is a perspective view, partially broken away, illustrating a sealing element of the seal assembly, and FIG. 4 is similar to FIG. 1 and illustrates an alternate embodiment of the seal assembly.

Figure 1:
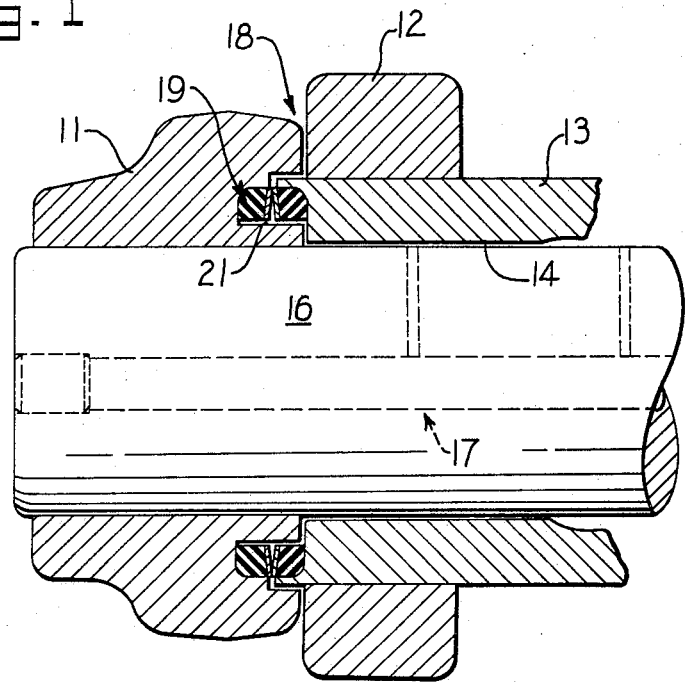
FIG. 1 is a partially sectioned view of one end of a track link assembly to illustrate a hinge joint and seal assembly therein.

A track link assembly, as illustrated in FIG. 1, forms a portion of an endless track (not shown), and has a first track link 11 which is to be joined for pivotal or relative rotation with a second track link 12. A bushing 13 is secured within the second track link 12, as by press-fit, and defines an axial bore 14. A track pin 16 is received for free rotation within the bore 14 of the bushing and is secured to the first track link 11, preferably by press-fit into a bore provided therein. Passages indicated by broken lines at 17 conventionally provide means for introducing lubricant within the track link assembly. The lubricant reduces wear during relative rotation particularly between the pin 16 and the bore 14 of the bushing.

The problems of providing a simple and effective seal, as discussed above, are readily realized from a study of FIG. 1. A juncture between the first track link 11 and the bushing 13 or the second track link 12, generally indicated at 18, provides means by which the lubricant may escape from the track link assembly. Additionally, in the environment described above, abrasive materials will tend to work into the track link assembly through the same juncture to act upon the relatively rotating surfaces as well as to interfere with effective lubrication therein.

To provide for effective sealing of the track link assembly in view of the above discussion, a seal assembly, indicated at 19, is disposed within a recess 21 formed along the juncture 18 by the first track link 11 and the bushing 13. The seal assembly 19, illustrated in greater detail in FIG. 2, comprises a pair of thin, annular, metal sealing rings 22 which are to be engaged in sealing relation at their outer edges 23. A resilient member, preferably consisting of a material such as nitrile rubber, is bonded to one side of each ring so that each resilient member interacts between one of the sealing rings and the outer track link 11 or the bushing 13 to urge the two sealing rings into sealing engagement. The construction of the seal assembly is further clarified by reference to FIG. 3 which shows one of the similar sealing rings 22 being a frustoconical spring washer of a type generally referred to as a Belleville spring. Each washer seal 22 is constructed of hardened steel, for example carburized stainless steel with a thickness of the order of 0.022 inch. The resilient members 24 have substantial cross-sections as illustrated in FIG. 3 to be effective as a thrust means for the washer seals as well as to perform the additional functions described below.

Figure 2:
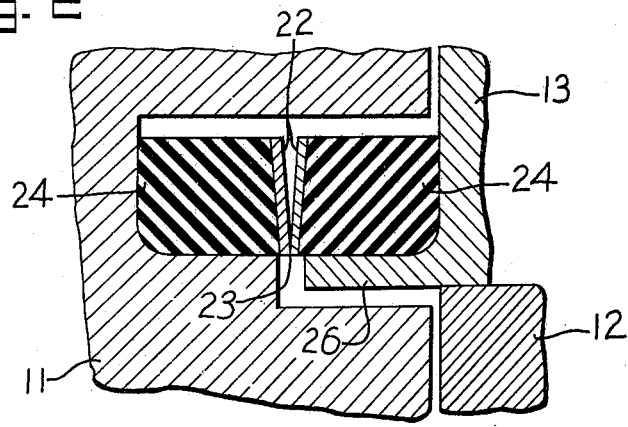
FIG. 2 is a fragmentary view taken from FIG. 1 to illustrate the seal assembly in greater detail.

Referring to FIGS. 1 and 2 particularly, the angular engagement of the two washer seals along their outer edges serve at least three important functions.

Firstly, as abrasive material works its way inwardly along the juncture 18, its passage into the bore 14 is positively prevented at the outer edge of the combined washer seals. On the other hand, the partially open relation of the inner surfaces of the washer seals permits lubricant from the bushing bore to pass thereinto so that lubricant is available to the sealing portion of the washer seals to reduce frictional drag and damaging heat buildup. As will be discussed below in relation to the resilient members, each of the washer seals is carried in rotation with either the first track link 11 or the bushing 13 by the resilient member 24.

Another function of the angular engagement of the washer seals is to provide for regeneration of a new similar sealing surface therebetween as the original sealing surfaces are worn away during relative rotation of the washer seals. Since the characteristics of the two washer seals are generally identical, abrasion of their outer edges will cause similar wearing away of material from each washer seal so that new sealing surfaces are constantly being regenerated inwardly along both of the washer seals. Thus, it is apparent that material from each of the washer seals will simultaneously wear away in a radially inwardly direction so that substantially all of the washer seals will be consumed in providing an effective seal over a long period of operation. Additionally, it is to be noted that by this arrangement, the seal band between the two washer seals will have a substantially constant width during the entire life of the seal assembly. The angle between the two washer seals is of particular importance in controlling the amount of lubricant which enters between the two seal rings as well as controlling the width of the seal band and therefore the rate at which the two washer seals wear away. It has been found that an optimum range for this angle is approximately from 2 to 13°. A typical angle between the two sealing rings illustrated in FIGS. 1 and 2 is approximately 6°.

A primary purpose of the resilient members is to act as thrust means for maintaining the seal engagement between the rings. However, the resilient members are to perform numerous other functions within the design of the present invention. For example, each of the seal rings is to rotate with either the outer track link 11 or the bushing 13. However, the rotational relationship between the outer link 11 and the bushing may include eccentric rotation due to manufacturing or assembly variations or normal stresses during operation. This relationship assists the spring seals to maintain sealing engagement therebetween even when the mating surfaces are not perfectly flat. Thus, the resilient members act as cushions to provide for alignment of the seal rings and thus better sealing engagement during such eccentric rotation. The cushioning effect of the resilient members together with spring action of the two sealing rings promotes continuous sealing along a relatively broad and positive sealing band therebetween even as wear occurs in the sealing rings.

In addition, with the present configuration, it is desirable that the resilient members exert generally uniform thrust in urging the two washer seals together in sealing relation. The two resilient members are of course selected to have generally identical resilience characteristics, for example. However, to further insure uniform thrust, the annular recess 21 formed by the outer track link 11 and the bushing 13 is preferably designed to be of a symmetrical configuration at least in that portion which contains the seal assembly 19. The outer track link is counter bored to generally provide the annular recess 21. An extension 26 of the bushing projects into the annular recess to achieve the desired symmetry. With this arrangement, the resilient members 24 may be similarly shaped and act against similarly shaped surfaces of the outer track link 11 and the bushing 13 respectively.

A simplified version of the seal assembly is illustrated at 19' in FIG. 4 disposed within a similar track link assembly. The seal assembly comprises a single washer seal 22' and resilient member 24' similar to one of the washer seals 22 and resilient members 24 of FIG. 1. However, in FIG. 1, the opposite surface against which each of the sealing rings acted to provide sealing engagement was formed by the other seal ring 23. However, in the present embodiment the opposite surface for providing sealing engagement is formed by a flat end 31 of the bushing adjacent the outer track link 11' which partially forms the annular recess 21'. The configuration of the outer track link 11' is simplified in that the annular recess 21' is of simple rectangular cross-section. The resilient member 24' urges the washer seal 22' against the bushing surface with the same angular relationship as described above. However, in this simplified embodiment, characteristics of the washer seal and the bushing end surface will vary as to hardness, materials of construction, etc. To further reduce uneven wear caused by these different characteristics, it has been found desirable to reduce the angle of engagement between the sealing surfaces to approximately 3° or less.

We claim:

1. In a track link assembly, the combination comprising:
   two track link members disposed for pivotal motion about a pin, the members forming an annular recess at their juncture, and
   a seal assembly disposed in the recess and comprising at least one thin, frustoconical uniform thickness spring washer seal of hardened metal and an annular resilient member of relatively large section which is bonded to one side thereof, said resilient member being disposed between said washer seal and a surface of one of the members which forms the recess to urge the radially outer edge of said washer seal into sealing engagement with an opposite surface associated with the other member while maintaining the radially inner edge of said washer seal out of engagement with said surface, the engagement angle of the washer seal with the surface being approximately 2–13°.

2. A track link assembly according to claim 1 wherein one of the members is a track link and the other member is a bushing secured to another track link, the opposite surface being a surface of the bushing which partially forms the annular recess and the engagement angle is approximately 3° or less.

3. A track link assembly according to claim 1 wherein the opposite surface is formed by a similar washer seal with a bonded, resilient member arranged so that the outer edges of the two washer seals are urged into angular sealing engagement by their resilient members.

4. A track link assembly according to claim 3 wherein one of the members is a track link and the other member is a bushing secured to another track link, the annular recess being formed by a recess in the one link and an extending portion of the bushing which projects into the one link recess so that the annular recess formed by the one link and the bushing is at least partially symmetrical and in concentric spaced apart relation from the pin, said seal assembly being disposed in the symmetrical portion of the annular recess.

References Cited

UNITED STATES PATENTS

| | | | |
|---|---|---|---|
| 2,341,900 | 2/1944 | Boden | 277—92 |
| 2,699,974 | 1/1955 | Deffenbaugh | 305—11 |
| 2,906,562 | 9/1959 | Burgman | 305—11 |
| 3,050,346 | 8/1962 | Simpson | 305—11 |
| 3,244,457 | 4/1966 | Ross | 305—11 |
| 3,336,089 | 8/1967 | Krickler | 305—11 |
| 3,390,923 | 7/1968 | Reinsma | 305—11 |
| 3,392,984 | 7/1968 | Reinsma | 277—92 |
| 3,402,974 | 9/1968 | Deli | 305—11 |

RICHARD J. JOHNSON, Primary Examiner

U.S. Cl. X.R.

277—92